J. Gore,
Saw Teeth.
Nº 1,372.    Patented Oct. 16, 1839.
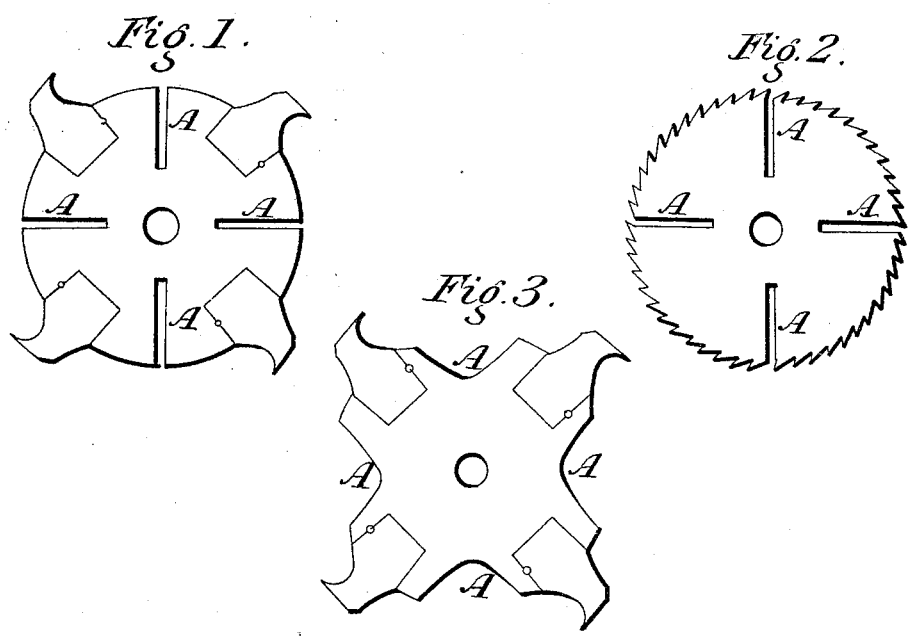

UNITED STATES PATENT OFFICE.

JONATHAN GOVE, OF FAYETTEVILLE, NORTH CAROLINA.

IMPROVEMENT IN CIRCULAR SAWS.

Specification forming part of Letters Patent No. 1,372, dated October 16, 1839.

*To all whom it may concern:*

Be it known that I, JONATHAN GOVE, of Fayetteville, in the county of Cumberland and State of North Carolina, have invented a new and useful Improvement in the Construction of the Circular Saw, which is described as follows, reference being had to the annexed drawings of the same, making part of this specification.

In the use of the common circular saw a great evil is experienced from the unequal expansion of the metal, arising from unequal friction, and consequent heat in sawing substances of less thickness or diameter than the semi-diameter of the saw, which causes the saw to buckle and wabble and perform its work very imperfectly, the friction and heat being around the periphery of the saw, which enters the substance to be cut, while there is none around the center part, which does not enter it. To remedy this evil I construct the circular saw with openings A, extending from the periphery toward the center a sufficient distance, but not as far as the center and between the teeth, whether of the bill-hook shape, as represented in Figure 1, or of the common form, as represented in Fig. 2, or as represented at Fig. 3.

I do not claim the making circular saws in segments, as that is not new; but

I do claim as my invention and desire to secure by Letters Patent—

The forming openings in the disk of a circular saw, extending from the periphery toward the center, in the manner and for the purpose described.

JONATHAN GOVE.

Witnesses:
  WM. P. ELLIOT,
  EDMD. MAHER.